April 30, 1963   L. JOHNSON   3,087,208
WEATHER STRIP DEVICE
Filed June 15, 1959   3 Sheets-Sheet 1
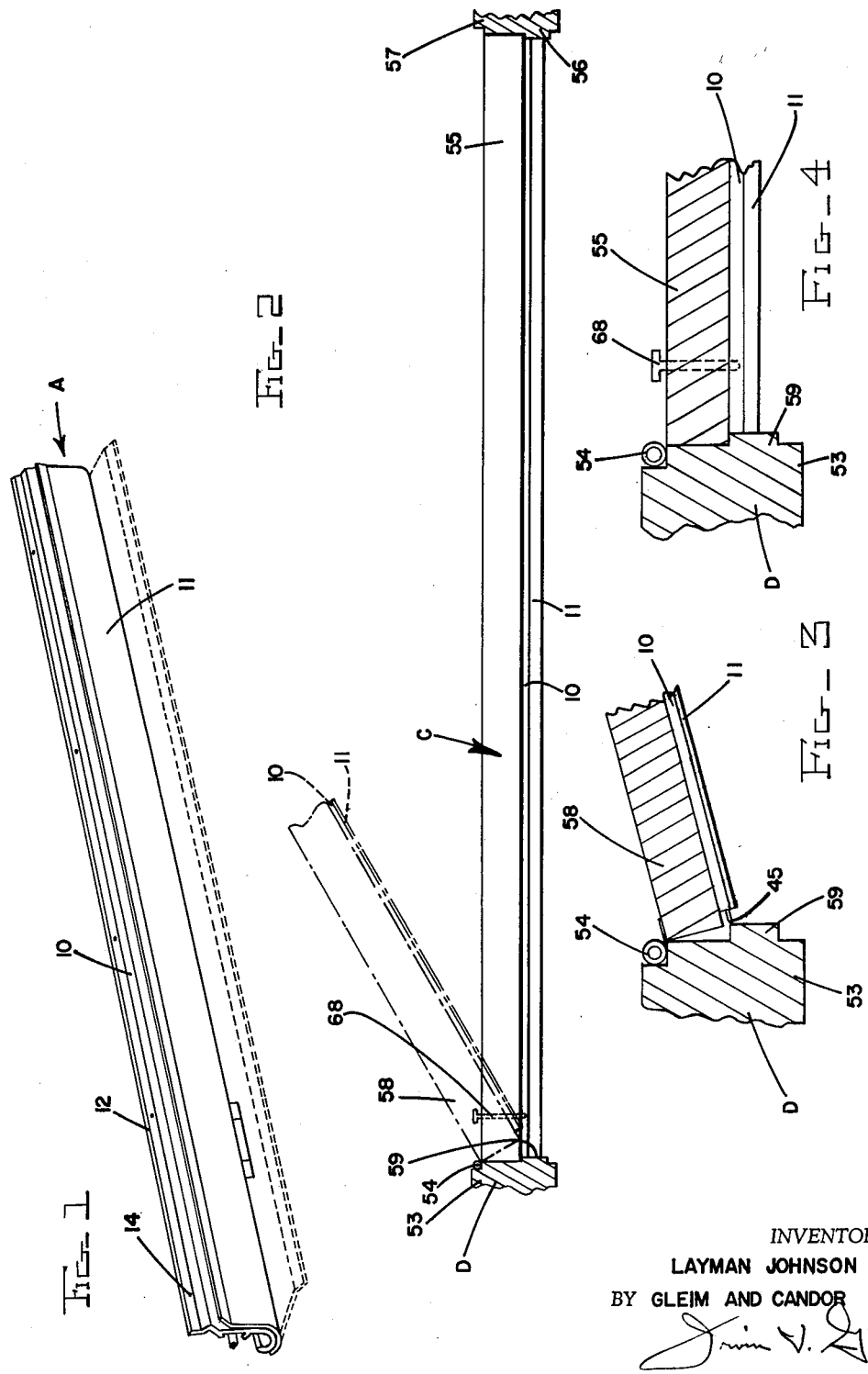
INVENTOR.
LAYMAN JOHNSON
BY GLEIM AND CANDOR
ATTORNEYS

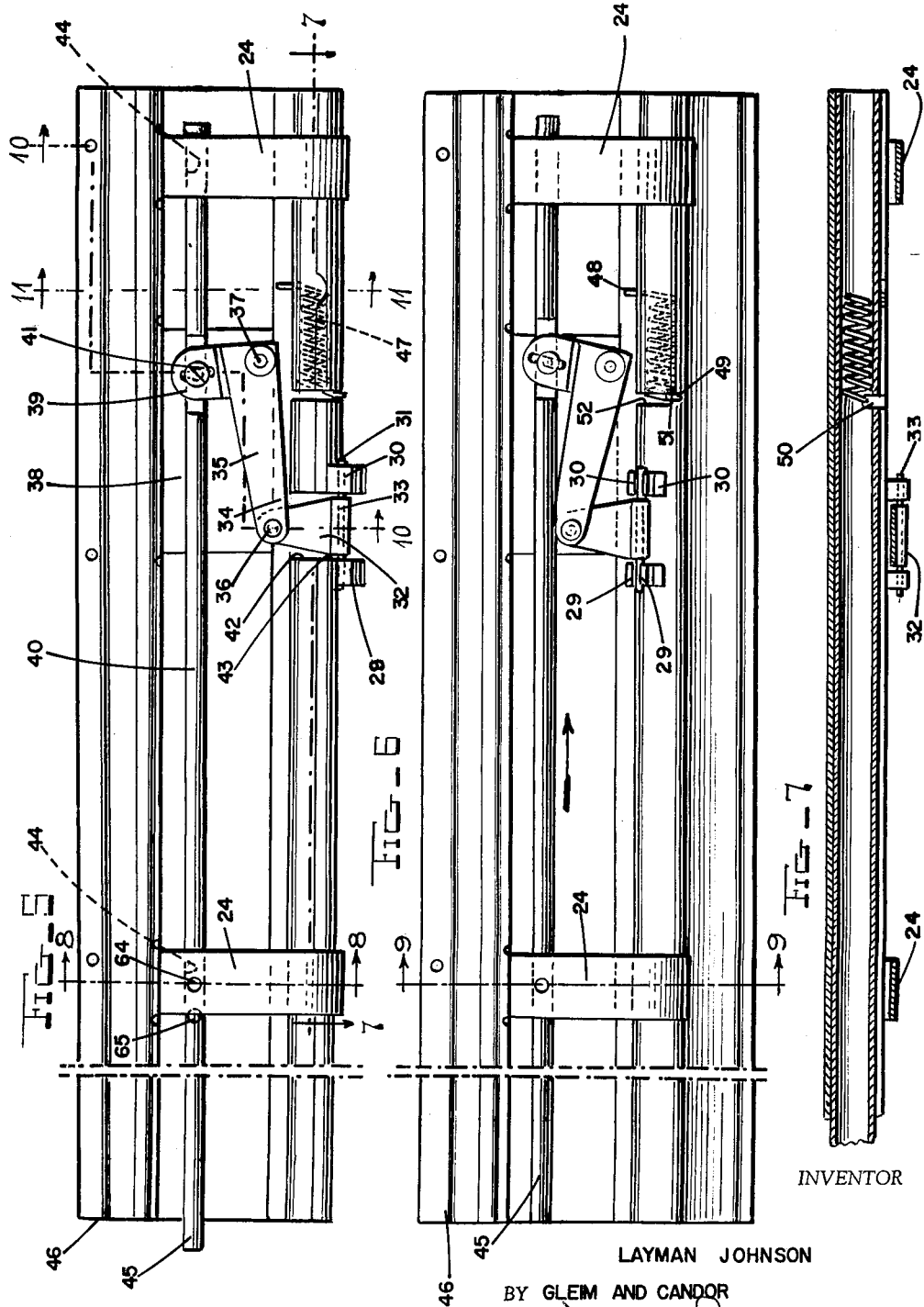

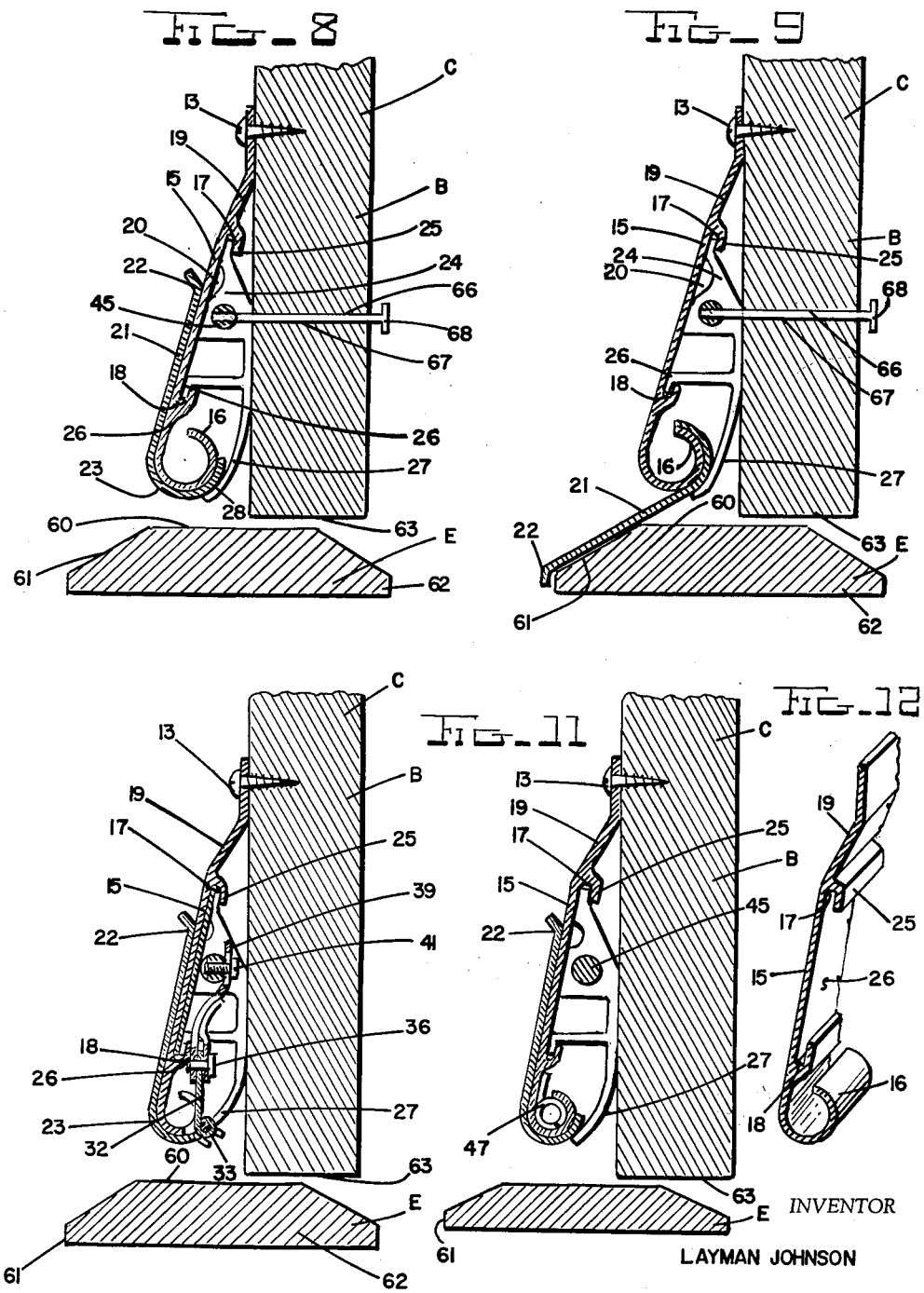

United States Patent Office 3,087,208
Patented Apr. 30, 1963

1

3,087,208
WEATHER STRIP DEVICE
Layman Johnson, 550 Lower Germantown Road,
Miamisburg, Ohio
Filed June 15, 1959, Ser. No. 828,301
4 Claims. (Cl. 20—67)

This invention relates to an improved weather prohibiting device, and, in particular, this invention relates to an improved weather strip device for a door and the like, the weather strip device having means for effectively and automatically closing the space between the door and its associated threshold when the door is in its closed position whereby rain, wind, and the like are prevented from entering under the door.

Heretofore, various types of weather strip devices have been provided wherein each device includes a housing secured along a lower portion of a door and a movable weather strip apron pivotally secured to the housing whereby the apron is adapted to be automatically moved downwardly over a raised threshold when the door is closed whereby the apron effectively closes the space between the bottom portion of the door and its associated threshold. When the door is opened, the apron is automatically raised above the threshold whereby the same does not impede the opening of the door.

It has been found, according to the teachings of this invention, that an improved weather strip device can be provided which not only effectively and automatically closes the space between a bottom portion of a door and its associated threshold when the door is closed, but which also selectively locks the door in its closed position.

Accordingly, it is an object of the present invention to provide an improved weather strip device.

It is another object of the present invention to provide improved weather strip device which is adapted to automatically close the space between a door and its associated threshold when the door is in its closed position and which is adapted to selectively lock the door in its closed position.

Other objects, uses and advantages of this invention will become apparent upon a reading of the following specification taken in conjunction with the accompanying drawings wherein:

FIGURE 1 is a perspective view of an improved weather strip device formed in accordance with the teachings of this invention;

FIGURE 2 is a top view of a door carrying the weather strip device of FIGURE 1 and illustrates the door in its closed position against its associated door frame;

FIGURE 3 is an enlarged fragmentary, cross-sectional view of the hinged end of the door illustrated in FIGURE 2 and illustrates the same in its partially closed position;

FIGURE 4 is a view similar to FIGURE 3 and illustrates the door in its fully closed position;

FIGURE 5 is a rear view of the weather strip device of FIGURE 1 and illustrates the same with its weather strip apron in the raised position;

FIGURE 6 is a view similar to FIGURE 5 and illustrates the weather strip device of FIGURE 1 with its weather strip apron in the down position;

FIGURE 7 is a fragmentary cross-sectional view of the weather strip device of FIGURE 1 and is taken on line 7—7 of FIGURE 5;

FIGURE 8 is an axial cross-sectional view of the weather strip device of FIGURE 1 and is taken on line 8—8 of FIGURE 5, FIGURE 8 illustrating the weather strip device secured to a door before the same has become completely closed;

2

FIGURE 9 is a view similar to FIGURE 8 and is taken on line 9—9 of FIGURE 6, FIGURE 9 illustrating the operation of the weather strip device when the door has been completely closed;

FIGURE 10 is a view similar to FIGURE 8 and is taken on line 10—10 of FIGURE 5;

FIGURE 11 is a view similar to FIGURE 10 and is taken on line 11—11 of FIGURE 5; and FIGURE 12 is a fragmentary perspective view of part of the weather strip device of FIGURE 1.

Reference is now made to the accompanying drawings wherein like reference numerals and letters are used throughout the various figures thereof to designate like parts where appropriate, and particular reference is made to FIGURE 1 illustrating an improved weather strip device formed in accordance with the teachings of this invention and generally indicated by the reference letter A. The weather strip device A comprises an elongated frame or housing 10 and a movable weather strip apron 11 pivotally secured to the housing 10 in a manner later to be described.

The housing 10 includes a flat upper portion 12 adapted to be detachably secured to a bottom portion B of a door C by a plurality of screws 13 respectively passing through suitable apertures 14 formed in the flat portion 12 of the housing 10 into the door C (see FIGURES 8–12). An angularly disposed portion 15 of the housing 10 extends downwardly and outwardly from the flat portion 12 thereof and forms a curl 16 at the lower end thereof. A pair of spaced parallel flanges 17 and 18 extend along the rear surface 19 of the housing 10, the flanges 17 and 18 projecting toward each other and defining a channel 20.

The weather strip apron 11 includes an elongated flat portion 21 having an angularly disposed flap or tab 22 at one end thereof and a curl 23 at the other end thereof, the curled end 23 of the apron 11 being superimposed about the curled end 16 of the housing 10 whereby the apron 11 is adapted to be pivoted relative to the housing 10.

A plurality of spaced braces 24 are disposed within the channel 20 of the housing 10, each brace 24 having outwardly directed flanges 25 and 26 respectively received between the flanges 17 and 18 of the housing 10 and the rear portion 19 thereof whereby the braces 24 are secured to the housing 10. Axial movement of the braces 24 in the channel 20 is prevented by staking the flange 17 on each side of each brace 24 as shown in FIGURES 5 and 6. An arcuately shaped or curled projection 27 extends downwardly from each brace 24 and has a lower portion 28 thereof superimposed upon the curled end 23 of the apron 11 whereby the apron 11 is pivotally secured to the housing 10 between the curled end 16 thereof and the curled ends 28 of the braces 24.

As shown in FIGURES 5 and 6, two axially spaced pairs of spaced lugs 29 and 30 extend outwardly from the curled end 23 of the apron 11. A pin 31 is carried by and extends between the pairs of lugs 29 and 30, the pin 31 having one end secured between the lugs 29 and the other end thereof secured between the lugs 30. A lever 32 is pivotally secured to the pin 31 at one end 33 thereof, the end 33 of the lever 32 being curled about the pin 31, and is pivotally secured between a bifurcated end 34 (see FIGURE 5) of an L-shaped lever 35 by a suitable pivot pin 36. The L-shaped lever 35 is pivotally secured by a pivot pin 37 to a plate 38 carried within the channel 20 of the housing 10. The other end 39 of the L-shaped lever 35 is pivotally secured to a rod or shaft 40 by a suitable pivot pin 41. The curled end 16 of the housing 10 is cut away at 42 and the curled end 23 of the apron 11 is cut away at 43 to receive the lever 32 when the same is in the position illustrated in FIGURES 5 and 10.

The rod 40 extends through suitable bores 44 formed respectively in the braces 24. An end 45 of the rod 40 extends beyond one end 46 of the housing 10 in the manner illustrated in FIGURE 5 when the apron 11 is in the raised position for a purpose hereinafter described.

The apron 11 is normally maintained in its raised position, as illustrated in FIGURE 11, by a spring 47 coiled within the curled end 16 of the housing 10 and having one end 48 thereof engaging the rear portion 19 of the housing 10 and the other end 49 thereof extending through a slot 50 formed in the curled end 16 of the housing 10 and engaging a surface 51 of the curled end 23 of the apron 11, the surface 51 of the apron 11 being defined by a slot 52 formed in the curled end 23 of the apron 11.

As shown in FIGURE 2, the door C is hinged to one vertically extending side 53 of a door frame D by suitable hinges 54. The door C is adapted to be closed against the frame D by pivoting the same to the position illustrated in full lines in FIGURE 2 whereby the free end 55 of the door C abuts an outwardly extending flange 56 of the other vertically extending side 57 of door frame D and the hinged end 58 of the door C abuts an outwardly extending flange 59 of the side 53 of the door frame D.

A raised threshold E extends between the opposed sides 53 and 57 of the door frame D and includes a top flat surface 60 and a pair of opposed angularly disposed surfaces 61 and 62 respectively intersecting the top surface 60. As previously stated, a bottom surface 63 of the door C is normally spaced above the top flat surface 60 of the threshold E when the door C is in the closed position. Therefore, it is desired to provide a weather strip device which will effectively close off the space between the threshold E and the door C when the same is in the closed position in order to prevent drafts, wind, rain, and the like from passing under the door C. The apron 11 of the weather strip device A performs this function in manner set forth hereinafter and also provides means for selectively locking the door C in the closed position.

As shown in FIGURES 5, 6, 8 and 9, the brace 24 disposed closest to the end 46 of the housing 10 has a passage 64 passing therethrough and intersecting the bore 44 thereof. An opening 65 is formed in the rod 40 and is adapted to be aligned with the passage 64 in the brace 24 when the rod 40 is axially moved to the position illustrated in FIGURE 6. A locking pin 66 is telescopically received within a bore 67 formed through the door C, the bore 67 being aligned with the passage 64 in the brace 24 when the weather strip device A is secured to the door C in the manner previously described. In this manner, the locking pin 66 is adapted to lock the rod 40 relative to the brace 24 in the position illustrated in FIGURE 6 when the pin 66 is projected into the aligned passage 64 and opening 65 such as by pushing against an enlarged end 68 of the locking pin 66. Similarly, the rod 40 may be unlocked from the brace 24 by withdrawing the pin 66 from the opening 65 in the rod 40 to the position illustrated in FIGURE 8.

The operation of the weather strip device A will now be described. As previously stated, the spring 47 tends to maintain the apron 11 in the raised position as illustrated in FIGURES 8, 10, and 11 when the door C is in the opened position relative to the frame D. As the door is moved toward the closed position (see FIGURE 3), the end 45 of the rod 40 engages the flange 56 of the door frame side 57 whereby further movement of the door C to the closed position causes the rod 40 to be moved to the right, as viewed in the drawings. Movement of the rod 40 to the right causes the L-shaped lever 35 to pivot about its pivot pin 37 and pull upwardly on the lever 32. The lever 32, in turn, causes the apron 11 to move downwardly relative to the housing 10 whereby the apron 11 is moved down over the threshold E as shown in FIGURE 9. The angularly disposed flange 22 of the apron 11 extends over the end of the threshold E. In this manner, when the door C is closed relative to the door frame D, the apron 11 effectively closes off the space between the bottom surface 63 of the door C and the threshold E.

If it is desired to lock the door C in the closed position, the locking pin 66 is inserted within the opening 65 of the rod 40 whereby the apron 11 is locked over the threshold E. If one were to try to enter the door C when the apron is locked in its lowered position, the apron 11 is moved against the threshold E and thus prevents the door C from being moved relative to the threshold E.

When it is desired to open the door C, the pin 66 is removed from the opening 65 in the rod 40 and the door is moved relative to the frame. The spring 47 automatically raises the apron 11 upwardly to the position illustrated in FIGURE 8 as the end 45 of the rod 40 moves away from the flange 59 of the door frame D.

Therefore, it can be seen that there has been described an improved weather strip device having means for effectively closing the space between a door and its associated threshold and having means for effectively locking the door in its closed position.

While the foregoing presents a preferred embodiment of the present invention, it is obvious that modifications and/or equivalents may be employed without departing from the scope of the invention, which is defined in the appended claims.

What is claimed is:

1. A weather strip device comprising a housing, a weather strip apron pivotally secured to said housing, a brace carried by said housing having a bore passing therethrough, an axially movable rod extending through said bore and being interconnected to said apron by suitable linkage means whereby said apron is pivoted away from said housing when said rod is moved in one direction whereby said apron is pivoted toward said housing when said rod is moved in the opposite direction, and selectively operable means for locking said rod in a predetermined position relative to said brace whereby said apron is locked in a predetermined pivotal position relative to said housing, said means for locking and rod relative to said brace comprising means defining a passage in said brace, said passage intersecting said bore, means defining an opening in said rod, said opening being aligned with said passage when said rod is moved to said predetermined position relative to said brace, and axially movable pin means received in said aligned passage and opening whereby said rod is locked relative to said brace.

2. In combination, a door frame having a pair of vertically extending sides, a raised threshold extending between said opposed sides of said frame, a door hingedly attached to one of said sides of said frame and having a bottom portion spaced above said threshold when said door is closed against said frame, a housing secured to said bottom portion of said door and carrying a movable weather strip apron, said apron extending substantially across said bottom portion of said door, means for moving said apron down over said threshold when said door is closed whereby said apron substantially closes said space between said door and said threshold, and selectively operable means for locking said apron down over said threshold whereby said door is locked in said closed position by said weather strip apron, said selectively operable means for locking said apron down over said threshold comprises an axially movable pin carried by said door.

3. In combination, a door frame having a pair of opposed vertically extending sides, each side including an outwardly projecting flange, a raised threshold extending between said opposed sides of said frame, a door hingedly attached to one of said sides of said frame and having a bottom portion spaced above said threshold when said door is closed against said flanges of said frame, said threshold extending beyond said closed door in the direction for closing said door, a housing secured to said bottom portion of said door and carrying a movable weather strip apron, said apron extending substantially across said bottom portion of said door, means for moving said apron down over said threshold when said door is closed whereby said apron substantially closes the space between said door and said threshold and extends between said opposed flanges of said sides of said frame, and selectively operable means for locking said apron down over said threshold whereby said door is locked in said closed position by said weather strip apron, said means for moving said apron comprising an axially movable rod carried by said housing and being interconnected to said apron by suitable linkage means, said rod being moved in one direction to a predetermined axial position relative to said housing by one of said flanges of said door frame when said door is closed whereby said apron is moved down over said threshold, said rod having a transverse bore provided therein, and said means for locking said apron over said threshold including an axially movable pin carried by said door and being adapted to be received in said bore in said rod when said rod is in said predetermined position.

4. A weather strip device comprising a housing, a weather strip apron pivotally secured to said housing, said apron having a deeply downturned free edge for locking engagement against a vertically disposed edge of a threshold, a brace carried by said housing and having a bore passing therethrough, an axially movable rod extending through said bore and being interconnected to said apron by suitable linkage means whereby said apron is pivoted away from said housing when said rod is moved in one direction and whereby said apron is pivoted toward said housing when said rod is moved in the opposite direction, and selectively operable means for locking said rod in a predetermined position relative to said brace whereby said apron is locked in a predetermined pivotal position relative to said housing whereby said apron and its mounting structure may be locked to said threshold, said housing having an end curled in one direction, said brace having an end curled in a direction opposite to and spaced adjacent to said curled end of said housing, and said apron having a curled end interposed between said curled ends of said housing and said brace whereby said apron is pivotally secured to said housing.

References Cited in the file of this patent

UNITED STATES PATENTS

| | | | |
|---|---|---|---|
| 653,606 | Armantrout | July 10, | 1900 |
| 669,865 | Smith et al. | Mar. 12, | 1901 |
| 686,244 | Armantrout | Nov. 12, | 1901 |
| 1,317,974 | Henderson | Oct. 7, | 1919 |
| 1,520,584 | Lundeen | Dec. 23, | 1924 |
| 1,780,420 | Flint | Nov. 4, | 1930 |

FOREIGN PATENTS

| | | | |
|---|---|---|---|
| 355,546 | Great Britain | Aug. 27, | 1931 |